Oct. 17, 1961 J. T. L. BROWN 3,005,072

ELECTRICALLY CONTROLLED SWITCHING DEVICE

Filed Oct. 22, 1959 3 Sheets-Sheet 1

INVENTOR
J. T. L. BROWN
BY
Henry M. Bissell
ATTORNEY

INVENTOR
J. T. L. BROWN
BY
Henry M. Bicall
ATTORNEY

Oct. 17, 1961 J. T. L. BROWN 3,005,072

ELECTRICALLY CONTROLLED SWITCHING DEVICE

Filed Oct. 22, 1959 3 Sheets-Sheet 3

INVENTOR
J. T. L. BROWN
BY
Henry M. Bissell
ATTORNEY 3,005,072
Patented Oct. 17, 1961

3,005,072

ELECTRICALLY CONTROLLED SWITCHING DEVICE

John T. L. Brown, Short Hills, N.J., assignor to Bell Telephone Laboratories, Incorporated, New York, N.Y., a corporation of New York Filed Oct. 22, 1959, Ser. No. 847,935
15 Claims. (Cl. 200—87)

This invention relates to electrically controlled switching devices and more particularly to such devices suitable for use in telephone switching networks.

Telephone communication systems in general use at the present time employ a large number of electrically controlled switches, or relays, to provide the numerous interconnecting paths between telephone subscribers as desired. In some telephone systems, many of these relays are arranged by stages in a switching network which permits the control of these relays by means of coincident signals. One common arrangement providing such control is a coordinate array wherein a particular relay is actuated by signals applied on the two coordinate control leads corresponding to the designation of the selected relay. Other relays in the same array which share a connection with one or the other of the two concurrently pulsed coordinate leads are not affected because the signal on an individual coordinate lead falls below the operating threshold of the relays.

A particular switching network which employs coincident signal control of the relays therein is disclosed in T. N. Lowry application Serial No. 847,918, filed October 22, 1959. This network differs from those generally employed hitherto in that it provides for the release of other priorly operated relays connected to either of the energized coordinate leads simultaneously with the operation of the selected relay connected to both of the pulsed coordinate leads. This switching network employs for its relays a structure which comprises a pair of remanently magnetic members of a material exhibiting a plurality of stable remanent magnetization states so that the relays may be controlled by signal pulses of shorter duration than the mechanical response time of the relay. These remanently magnetic members have particular control windings associated therewith which establish one magnetic flux configuration for a control signal on only one lead and a different magnetic flux configuration for concurrent control signals on a pair of leads. The energizing windings which provide this type of operation essentially comprise four coils having specified numbers of turns which are interconnected in a particular fashion to form the pairs of control windings. My invention is directed to an improvement of such a device in which control of the device is provided essentially by a pair of windings individually associated with the corresponding magnetic members.

It is, therefore, a general object of this invention to provide an improved electrically controlled switching device.

More particularly, it is an object of this invention to provide an improved switching device suitable for use in the switching network described in the above-cited application of T. N. Lowry.

It is a further object of this invention to provide a switching device controllable by signals applied on a pair of control leads which is simpler to manufacture and more economical to produce than priorly known devices of its type.

It is a specific object of this invention to provide an improved type of switching device which is operated by concurrent signals on both of a pair of energizing leads but is released by an energizing signal on only one of its leads.

One specific embodiment of my invention employs a pair of magnetic reed switches of the type described by O. M. Hovgaard et al. in "Development of Reed Switches and Relays," vol. 34, Bell System Technical Journal, page 309 ff., in combination with a pair of magnetic members of a material exhibiting a plurality of stable remanent magnetization states, as disclosed in A. Feiner et al. application Serial No. 824,225, filed July 1, 1959. Each of the magnetic members is provided with an individual control solenoid wound about a substantial portion of its length. In accordance with an aspect of my invention, the magnetic members are positioned adjacent each other and the windings of the two members have their respective turns interleaved with each other in the region between the members, only enough space being provided therein to permit the positioning of the turn conductors. In this manner, each remanently magnetic member is sufficiently close to the solenoid of the other member as to be influenced by its magnetic field in the absence of current in its own solenoid. Although both sides of the energized solenoid develop opposing magnetic fields in the magnetic member of the unenergized solenoids, the relative distances to the two sides of the solenoid are such that only the field of the adjacent side is effective at this magnetic member. The direction of the magnetic lines of force in the member within the unenergized solenoid is opposite to that of the lines of force in the other member. Thus it can be seen that the energization of only one solenoid establishes a circulating flux condition in the magnetic circuit comprising the two magnetic members which substantially precludes any magnetic flux from the path through the associated reed switches. As a result, the reed switches assume the released condition whenever a control pulse is applied to only one of the two solenoids of the combination.

On the other hand, if both solenoids are energized by currents in the same direction, the remanently magnetic members become magnetized so as to produce like magnetic poles at the corresponding ends thereof. Magnetic flux is thereby directed through the associated reed switches, causing them to operate. Thus a device is provided in accordance with my invention which permits the coincident operation of the associated switches while permitting release by a single pulse upon either one of the two control windings. It may be noted that the releasing pulse may be of either polarity. Furthermore, the operating pulses may be of either polarity, providing both are of like polarity. Thus the device advantageously may be released by a pulse of the same polarity as the pulses employed to operate it.

The above-described operation of this structure may be enhanced in accordance with a further aspect of my invention by including a short-circuited winding about both of the magnetic members and their solenoids. This short-circuited winding, by establishing mutual inductance between the two magnetic members, produces a result which is similar to the effect attained by spacing the magnetic members close together so that each may be influenced by the solenoid of the other. When a single solenoid of the combination is energized in order to effect release of the associated switches, the short-circuited winding develops a flux which opposes the original flux. This develops a magnetization state in the unenergized member which is opposite to that established in the energized member. Thus the circulating flux condition is established in the two magnetic members which substantially precludes the passage of flux through the switches and they are released. However, the application of coincident control pulses of like polarity to both of the solenoids establishes the magnetization condition which operates the switches. In this case, currents induced in the short-circuited winding from the respective energized solenoids are in opposite directions, thereby balancing out each other, and the effect is similar to the operation of the structure without a short-circuited winding.

A further advantage accrues from the utilization of a short-circuited winding in this specific embodiment of my invention. This short-circuited winding has the effect of increasing the time constant of the operating circuit or, in effect, lengthening the energizing pulse. As a result, where desired, materials having a lesser magnetic remanence but a correspondingly greater permeability to magnetic flux may be employed for the magnetic members. In such an application the relay is actuated by the lengthened energizing pulse, rather than by the remanent magnetization condition produced by an unaltered energizing pulse, and once actuated is maintained in that position by the lesser remanence which is sufficient to hold the relay contacts in position but need not be great enough to close the contacts. Thus an arrangement is provided in accordance with this aspect of my invention which advantageously provides for the control of a magnetically responsive switch by control pulses shorter in duration than the mechanical response time of the switch.

In one specific embodiment of my invention, the short-circuited winding advantageously takes the form of a copper sleeve which thus comprises a single turn that surrounds the two remanently magnetic members and their solenoids. This structure simplifies the fabrication of the device and permits its production at lower cost.

In another specific embodiment of my invention a reed switch of the type disclosed in R. L. Peek, Jr., application Serial No. 847,919, filed October 22, 1959, is enclosed by a short-circuited winding in addition to two specific control windings to afford the type of control described hereinabove. The switch of this embodiment has remanently magnetic reeds of a material exhibiting a plurality of remanent magnetization states. Control windings are individually associated with each reed to determine the magnetization states of the corresponding reeds. When the reeds are magnetized so that opposite magnetic poles are established at their free ends, they move together and remain so. Conversely, when magnetic poles of like polarity are established there, the free ends move apart and the switch is opened. The short-circuited winding about the structure provides a coupling between the two reeds so that when only one control winding is energized, the short-circuited winding establishes a remanent magnetization state in the reed of the unenergized winding which is directed oppositely to the remanent magnetization state established in the reed enclosed by the energized winding. Resulting magnetic poles of like polarity are thus established at the free ends of the reeds and the switch is opened. Accordingly it can be seen that this embodiment of my invention provides for the closing of its switch members by concurrent pulses of like polarity while insuring, through the short-circuited winding encircling the switch, that the switch members open in response to a signal of either polarity on either control winding alone.

It is a feature of this invention that a short-circuited winding be provided in a relay structure comprising a pair of remanently magnetic members to establish a particular magnetization condition in one member when the other member is magnetized by a control signal applied to its winding alone.

More specifically it is a feature of this invention that a relay comprising a pair of remanently magnetic members be operated by a pair of concurrently applied control signals and be released by a single control signal of either polarity, this release being effected by a short-circuited winding enclosing the magnetic members.

It is a feature of one specific embodiment of my invention that a relay comprising a pair of remanently magnetic members, each having an individually-associated control winding, have the magnetic members and their windings adjacently positioned so that a control signal on only one winding establishes opposite magnetization states in the two remanently magnetic members to release the relay.

A complete understanding of this invention and of these and other features thereof may be gained from consideration of the following detailed description and the accompanying drawing, in which:

FIGS. 1A and 1B depict certain structures disclosed in the above-mentioned application of T. N. Lowry;

Figure 1A:
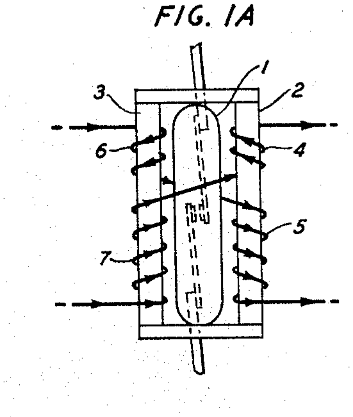

In FIG. 1A, a reed switch 1 of the type described in the above-cited article by Hovgaard et al. and commonly designated a "soft" magnetic reed switch, is shown in combination with a pair of remanently magnetic members 2 and 3 of a material exhibiting a plurality of stable remanent magnetization states, thereby defining a switch structure as further fully disclosed in Feiner et al. application Serial No. 824,225, filed July 1, 1959. The members 2 and 3 are wound with coils 4, 5, 6 and 7 which are interconnected to provide the particular type of relay control disclosed in the above-mentioned Lowry application.

Figure 1B:
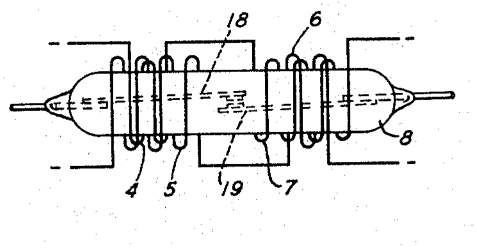

FIG. 1B depicts the control winding arrangement of Lowry applied to a reed switch 8 of the type disclosed in the above-cited Peek application, which may be referred to as a "hard" magnetic reed switch. In the hard magnetic reed switch 8, the reeds 18 and 19 themselves are remanently magnetic members of a material exhibiting a plurality of stable remanent magnetization states. In FIGS. 1A and 1B it will be noted that the coils 4 and 6 have fewer turns than do the coils 5 and 7. These coils 4, 5, 6 and 7 are of particular winding directions and are interconnected in pairs so that a signal on only one serially connected coil pair magnetizes the associated remanently magnetic members 2 and 3 or 18 and 19 in opposite directions. In the structure of FIG. 1A this produces a circulating magnetic flux about the magnetic circuit external to the switch 1 while in the structure of FIG. 1B this develops magnetic poles of like polarity at the free ends of the remanently magnetic reeds 18 and 19. In both cases the result is that the switch is opened by the single energizing signal. If, however, control signals are applied concurrently to both pairs of serially connected coils, the magnetomotive forces of the coils 5 and 7 overcome those of coils 4 and 6 and magnetize the remanently magnetic members 2 and 3 or 18 and 19 in the same direction. In the structure of FIG. 1A, this drives magnetic flux through the switch 1 while in the structure of FIG. 1B it produces opposite magnetic poles at the ends of the remanently magnetic members 18 and 19. In both structures the result is that the switches are closed for this magnetization condition. Thus it can be seen that the switches of the structures of FIGS. 1A and 1B are closed by concurrent energizing signals of like polarity on both serially connected coil pairs while the switches are opened by individual signals on only one of the pairs.

Figure 2:
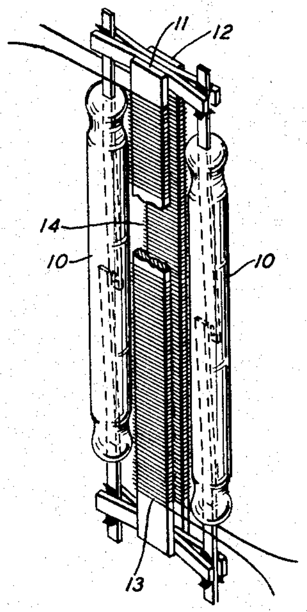
FIG. 2 depicts one specific embodiment of my invention.

FIG. 2 depicts one specific embodiment of my invention which provides the type of control described with respect to the structures of FIGS. 1A and 1B but accomplishes this with fewer windings provided in a simpler arrangement.

In FIG. 2 a pair of soft, or non-remanent, magnetic reed switches 10 are shown in combination with a pair of remanently magnetic members 11 and 12 of a material exhibiting a plurality of stable remanent magnetization states. A coil 13 is wound about the member 11 while the member 12 has a coil 14 surrounding it. Magnetic member 11 is shown with a portion removed in order to afford a better view of the structure behind it. In accordance with an aspect of my invention, the members 11 and 12, together with respective coils 13 and 14, are situated close together in the manner already described so that each magnetic member 11 or 12 may be controlled by the coil 14 or 13 on the opposite member in the absence of a magnetic field from its own control coil. For example, when only the coil 13 is energized the member 11 is magnetized in a particular direction. The member 12 becomes magnetized in the opposite direction due to the magnetic field on the outside of the energized winding 13. Accordingly, magnetic flux circulates within the members 11 and 12, insufficient flux is directed through the switches 10 to maintain them in the operated condition and they release, if priorly operated. This result will follow regardless of the polarity of the energizing pulse and regardless of which one of the coils 13 and 14 is energized.

However, when both of the coils 13 and 14 are energized by concurrent signals of the same polarity, each determines the magnetization of the particular magnetic member 11 or 12 which it surrounds while overcoming the opposite magnetomotive force of the coil of the other magnetic member. Accordingly, the members 11 and 12 become magnetized in the same direction and direct magnetic flux through the switches 10 to operate them and maintain them in the operated state.

Figure 3A:
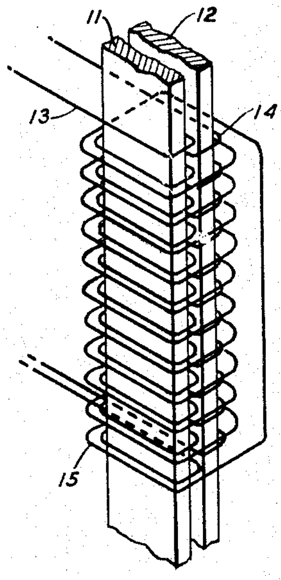
FIGS. 3A and 3B depict a portion of the embodiment of FIG. 2 modified in accordance with particular aspects of my invention.
Figure 3B:
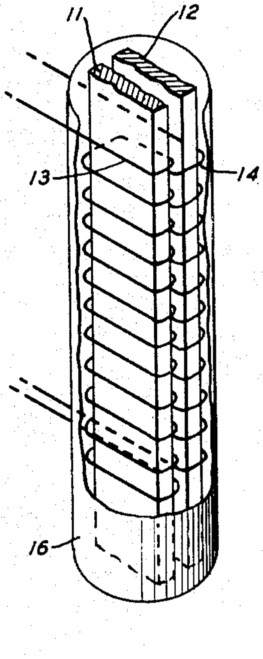

FIGS. 3A and 3B depict portions of the remanently magnetic members 11 and 12 of the structure of FIG. 2 in accordance with other specific embodiments of my invention. The windings 13 and 14 are shown with their corresponding turns interleaved in order to minimize the space between the remanently magnetic members and their windings and to provide the maximum influence upon a particular member 11 or 12 by the opposite winding 14 or 13, respectively. In accordance with one aspect of my invention an additional coil 15 is shown wound about both of the remanently magnetic members 11 and 12. While it is possible to produce the desired control of the structure of FIG. 2 with only one pair of windings (the individual coils 13 and 14) the described operation during the application of a control signal on only one winding may be enhanced by the provision of the third coil 15 which is a short-circuited winding. It will be noted that the effect of the short-circuited winding is to produce equal and opposite flux in the two remanently magnetic members 11 and 12 when an energizing signal is applied to a single coil 13 or 14. Thus it has the effect of enhancing the operation described with respect to FIG. 2 when only one of the control windings 13 or 14 is energized.

In FIG. 3B, in accordance with this aspect of my invention, the short-circuited winding comprises a cylinder, or sleeve, 16 enclosing the members 11 and 12 and their respective control coils 13 and 14. This cylinder 16 is of a conducting material, which advantageously may be copper, to provide in effect a single shorted turn. Its effect is the same as that described for the short-circuited winding 15 of FIG. 3A but its simpler structure increases the ease of fabrication of the device.

Figure 4A:
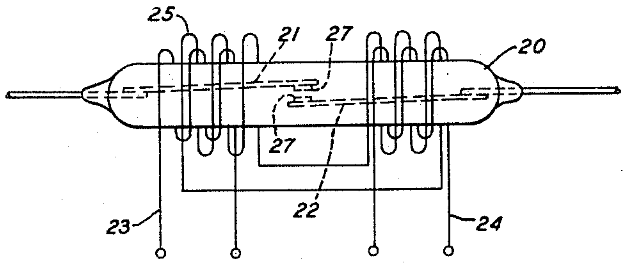
FIGS. 4A, 4B and 4C depict other specific embodiments of my invention.
Figure 4B:
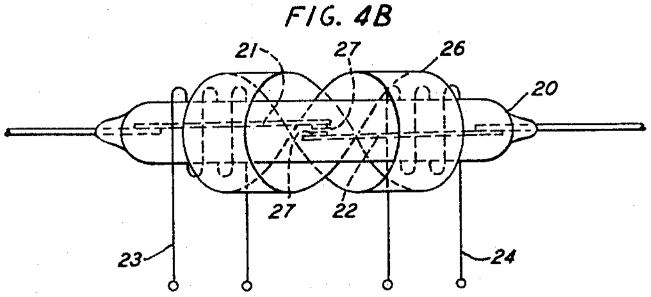
Figure 4C:
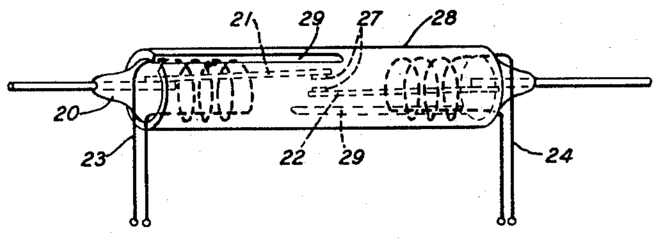

FIGS. 4A, 4B and 4C depict arrangements in accordance with an aspect of my invention which apply the above-described principles to hard magnetic reed switches, as shown in FIG. 1B. In these figures a hard magnetic reed switch 20 is shown having remanently magnetic reeds 21 and 22 of a material exhibiting a plurality of stable remanent magnetization states. Individual control windings 23 and 24 are respectively associated with the remanently magnetic reeds 21 and 22. The embodiment depicted in FIG. 4A has, in addition, a short-circuited winding 25. When either of the windings 23 or 24 is energized the short-circuited winding 25 develops a magnetomotive force which opposes the magnetomotive force of the energized coil. As a result, the reeds 21 and 22 are magnetized in opposite directions, one by the energization of its associated winding and the other by the induction of the short-circuited winding 25. Accordingly magnetic poles of like polarity are formed at the free ends of the remanently magnetic reeds 21 and 22 which force these reeds apart, thus opening the switch contacts 27. This result will follow regardless of which control winding 23 or 24 is energized and regardless of the polarity of the energizing signal. When, however, both coils 23 and 24 are energized by concurrent signals of like polarity, the induced field of the short-circuited winding 25 is nullified and the remanently magnetic reeds 21 and 22 are magnetized in the same direction. This develops opposite magnetic poles at the contacts 27 which pull the reeds together and close the switch. The remanent magnetization states of the reeds thereafter maintain the established state of the switch.

In the structures of FIGS. 4B and 4C, the short-circuited winding 25 of FIG. 4A is replaced by a single element 26 or 28, respectively, of a conducting material, which advantageously may be copper, that is arranged as shown. The element 26 in FIG. 4B comprises a strap which provides a turn individually about each of the remanently magnetic reeds 21 and 22 and is connected back upon itself to complete the short circuit. The element 28 of FIG. 4C provides the major portion of a turn individually about each of the remanently magnetic reeds 21 and 22 but is formed more simply of a sleeve with slots cut out as shown. Operation of the devices depicted in FIGS. 4B and 4C is the same as that of FIG. 4A; the elements 26 and 28 merely serve to simplify the fabrication of the respective structures.

Figure 5:
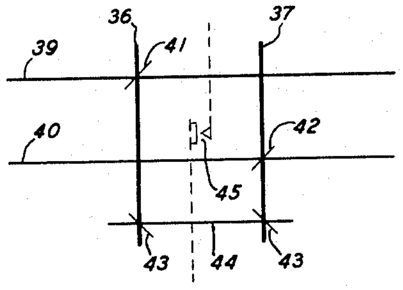
FIG. 5 is one form of schematic representation of the specific embodiments of my invention depicted in FIGS. 2, 3 and 4.

FIG. 5 is a schematic representation of the various embodiments of my invention described above. This schematic representation employs mirror symbols, as described in an article by M. Karnaugh entitled "Pulse-Switching Circuits Using Magnetic Cores," Proceedings of the I.R.E., vol. 43, No. 5, page 570. An appreciation of this schematic may be obtained when comparing it with one of the embodiments of my invention, such as that of FIG. 4A. The remanent magnetic members designated 36 and 37 in the schematic correspond to the magnetic reeds 21 and 22 of this embodiment, while the control windings 41 and 42, with their associated input leads 39 and 40, in accordance with the conventions of mirror symbol schematics correspond, respectively, to the control windings 23 and 24. Contacts 27 are indicated in the schematic as contacts 45. Additionally, in the schematic there are indicated on the magnetic members and coupling the magnetic members mutual inductance windings 43. These mutual inductance windings 43 and the connecting lead 44 correspond to the short-circuited winding 25 in the embodiment of FIG. 4A or to the various other means disclosed in the various embodiments for effecting mutual inductance coupling between the two remanent magnetic members so that in response to the establishment of a magnetic remanent state in only one of the magnetic members the mutual coupling between the two members assures the establishment of the opposite magnetic state in the other of the two members.

Figure 6:
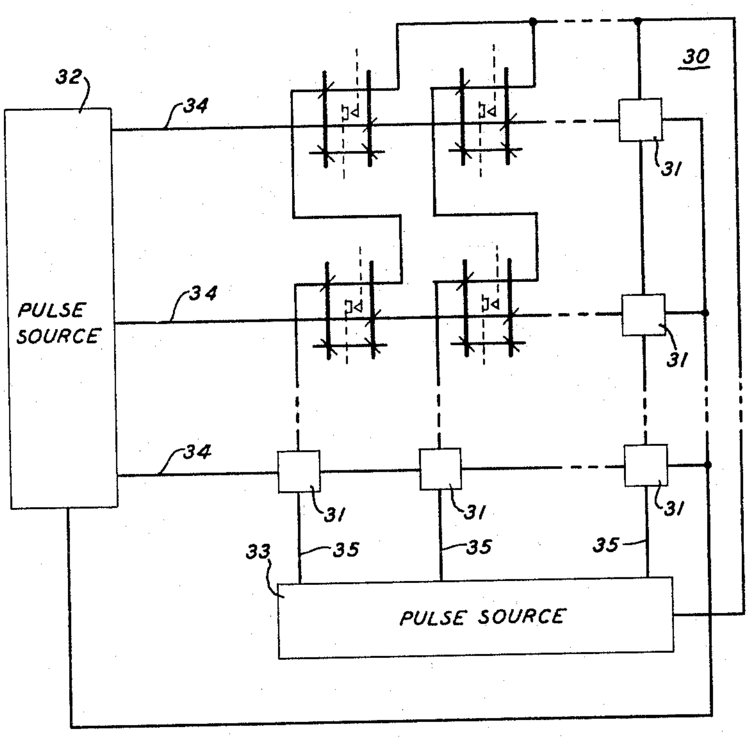
FIG. 6 is a block diagram of a switching matrix employing structures of my invention.

FIG. 6 depicts a switching matrix 30 comprising a plurality of switching structures 31 of the type described hereinabove. These switching devices are depicted by the schematic of FIG. 5 or by a block diagram and may correspond to any one of the above-described embodiments of my invention. The respective control windings of the individual devices 31 are connected together by groups to form rows and columns of the matrix 30. Pulse sources 32 and 33 are connected to the rows and columns, respectively, to provide coordinate selection of the individual switches 31. For example, if the upper left-hand switch 31 is to be closed, concurrent pulses are applied to the row 34 and the column 35. Accordingly, any priorly operated switches 31 which are in either the row 34 or the column 35 will have only one control winding energized and therefore will be released simultaneously with the operation of the selected upper left-hand switch 31. By means of this control arrangement, it is possible to effect automatic release of no-longer-needed switches when a desired connection is established by the operation of a selected switch. The operation of such a matrix is more fully described in the above-mentioned Lowry application.

It is to be understood that the above-described arrangements are illustrative of the principles of the invention. Numerous other arrangements may be devised by those skilled in the art without departing from the spirit and scope of the invention.

What is claimed is:

1. An electrically controlled switching device comprising a pair of electrical contacts, a pair of remanently magnetic members of a material exhibiting a plurality of stable remanent magnetization states, and electromagnetic field producing means associated with said members for controlling said contacts, said field producing means comprising a winding individually encompassing each of said members and mutual inductance means providing coupling between said members so that said switch operates upon the application of concurrent control signals to said windings and releases upon the application of a control signal to only one of said windings.

2. An electrically controlled switching device in accordance with claim 1 wherein said mutual inductance means comprises means mounting said remanently magnetic members side by side in sufficiently close proximity so that the corresponding turns of the respective windings are interleaved with each other and are equally spaced between said magnetic members.

3. An electrically controlled switching device in accordance with claim 1 wherein said mutual inductance means comprises a short-circuited winding encompassing both of said remanently magnetic members to determine the remanent magnetization state of one member when a control signal is applied only to the individual winding of the other said member.

4. An electrically controlled switching device in accordance with claim 3 wherein said short-circuited winding comprises a sleeve of a conductive material.

5. An electrically controlled switching device in accordance with claim 4 wherein said short-circuited winding comprises a copper sleeve.

6. An electrically controlled switching device in accordance with claim 1 wherein said remanently magnetic members comprise reeds suspended from their opposite ends and overlapping at the free ends thereof.

7. An electrically controlled switching device in accordance with claim 6 wherein said conducting windings are individually wound about corresponding ones of said reeds and further comprising a short-circuited winding inductively coupling both of said reeds.

8. An electrically controlled switching device in accordance with claim 7 wherein said short-circuited winding further comprises a strap of conducting material encircling each of said reeds in successive turns and having its ends connected together.

9. An electrically controlled switching device in accordance with claim 7 wherein said short-circuited winding comprises a sleeve of conducting material having slots cut in opposite sides of said sleeve and extending partially along the length thereof from opposite ends of said sleeve.

10. An electrical circuit controlling device comprising a magnetically responsive switch, a pair of magnetic members of a material exhibiting a plurality of stable remanent magnetization states, individual electromagnetic field producing means comprising a conductive winding on each of said magnetic members for selecting particular ones of said stable remanent magnetization states in said members to close said switch upon the concurrent energization of both of said windings, and means comprising a short-circuited winding for selecting a different one of said stable remanent magnetization states in one of said magnetic members to open said switch upon the energization of only said conductive winding on the other of said magnetic members.

11. An electrical circuit controlling device comprising a magnetically responsive switch including a pair of overlapping magnetic contact members and a pair of terminals connected to corresponding ones of said members, remanently magnetic means magnetically connected to said terminals in parallel with said switch for determining the state of said switch comprising a pair of adjacent elements of a material exhibiting a plurality of stable remanent magnetization states, and means inductively coupling both of said elements comprising an individual conducting winding on each of said elements and mutual inductance means providing coupling between said elements for determining the remanent magnetization states of both of said elements.

12. An electrical circuit controlling device in accordance with claim 11 wherein said mutual inductance means comprises a short-circuited winding encompassing both of said elements.

13. An electrical circuit controlling device comprising a magnetically responsive switch, remanently magnetic means comprising a pair of magnetic members of a material exhibiting a plurality of stable remanent magnetization states for determining the condition of said switch, conductive windings individually associated with corresponding ones of said magnetic members, and means inductively coupling said magnetic members for establishing a predetermined remanent magnetization state in one of said magnetic members upon the energization of only the conductive winding associated with the other said magnetic member comprising a short-circuited winding encompassing both of said magnetic members.

14. An electrical circuit controlling device in accordance with claim 13 wherein said inductively coupling means further comprises means positioning said magnetic members closely adjacent and substantially parallel to each other, the individually associated conductive windings having their corresponding turns interleaved between said magnetic members.

15. An electrical circuit controlling device comprising a pair of contacts, a pair of magnetic members of a material exhibiting stable states of magnetic remanence, a control winding on each of said members for establishing a first remanent state in each of said members for effecting closure of said contacts on energization of both of said control windings, and mutual inductance means providing coupling between said members for establishing a second remanent magnetic state in one of said members in response to establishment of said first remanent state in only the other of said members to effect release of said members.

No references cited.